March 2, 1937. H. F. PATTERSON 2,072,379
MOTOR VEHICLE POWER TRANSMISSION
Filed April 18, 1934 3 Sheets-Sheet 2
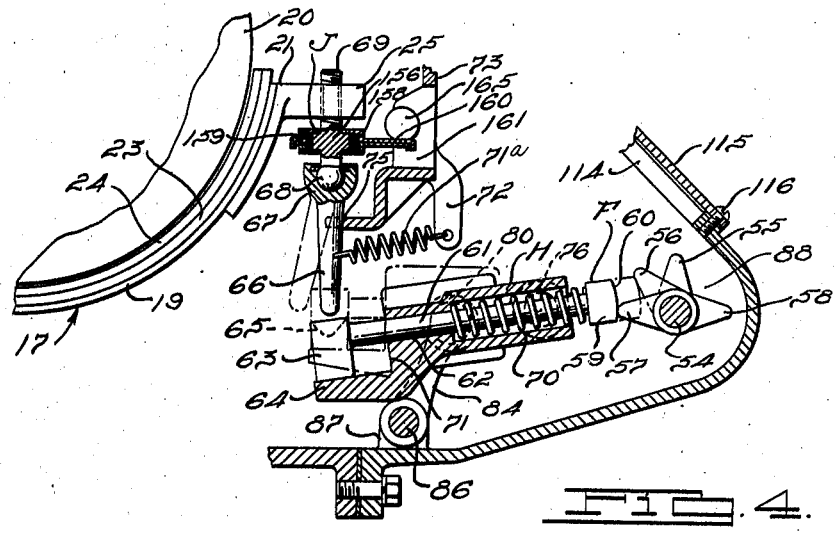
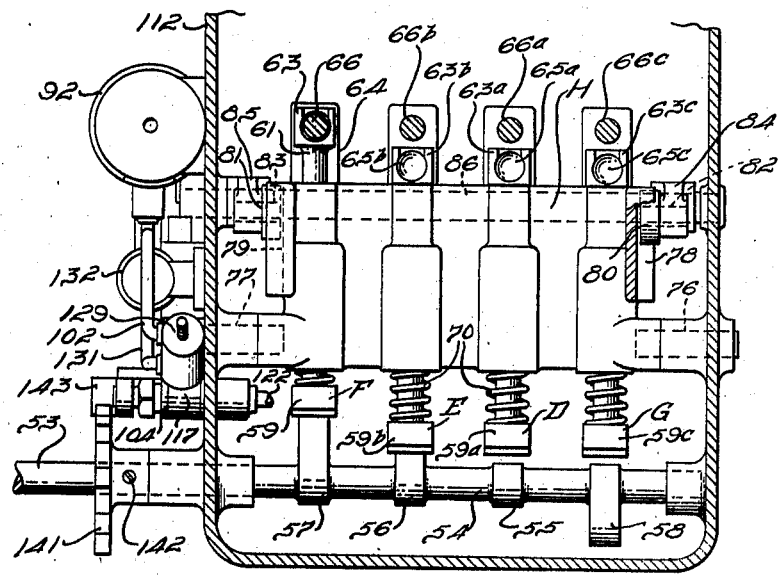
INVENTOR.
Herbert F. Patterson.
BY
Harness, Lind, Patee, & Harris
ATTORNEYS.

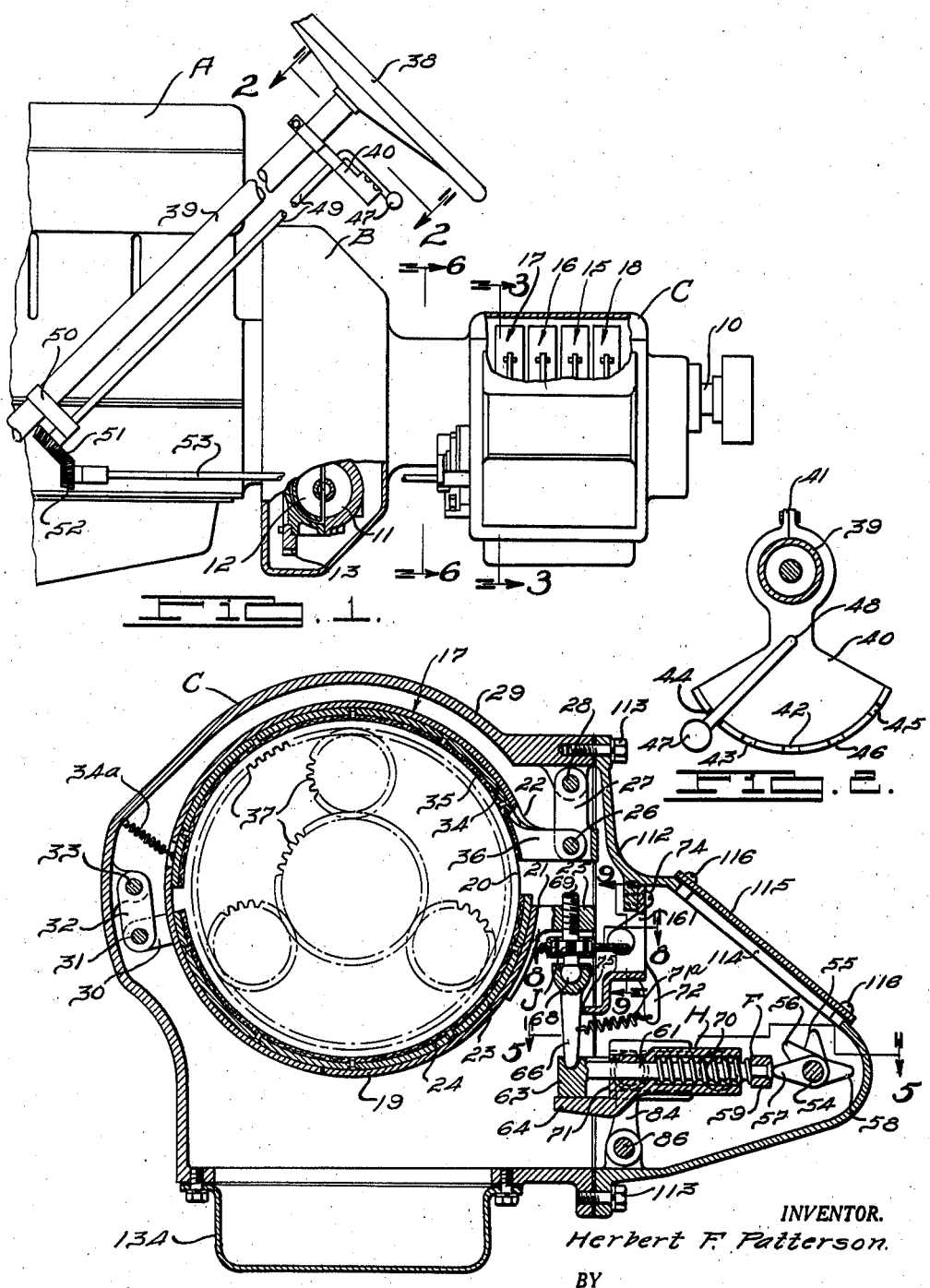

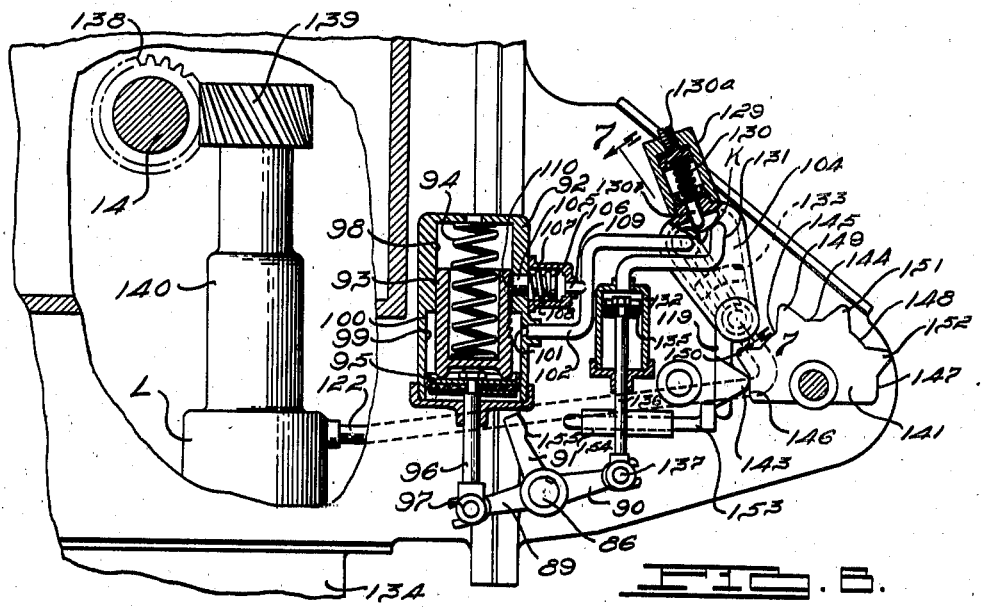
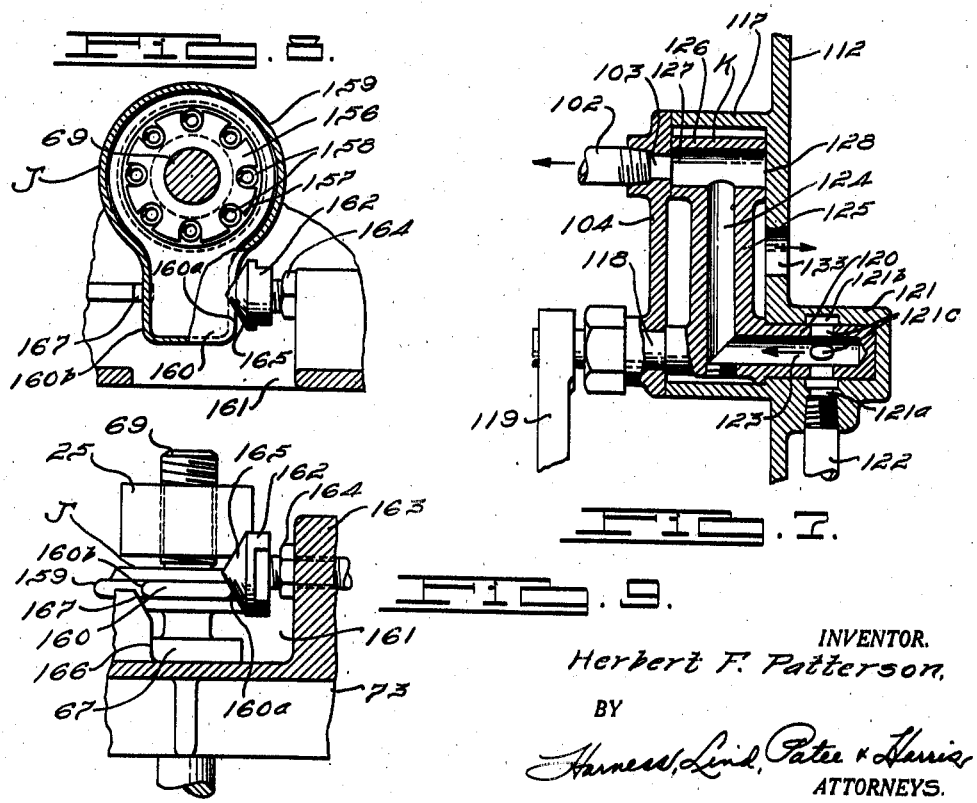

Patented Mar. 2, 1937

2,072,379

UNITED STATES PATENT OFFICE 2,072,379

MOTOR VEHICLE POWER TRANSMISSION

Herbert F. Patterson, Detroit, Mich., assignor to Chrysler Corporation, Detroit, Mich., a corporation of Delaware Application April 18, 1934, Serial No. 721,108

26 Claims. (Cl. 74—262)

This invention relates to power transmission devices and refers more particularly to improvements in power transmission devices especially adapted for use in connection with motor vehicles, although not necessarily limited thereto.

My invention, in certain more limited aspects thereof, provides improvements in the drive and control for power transmission systems of the type including the well-known epicyclic or planetary transmission gear box. With such planetary transmissions, it is customary to arrange the gearing to provide for the desired number of speed ratios between the engine and vehicle driving ground wheels and such gearing is customarily selected and controlled to obtain the desired driving speed ratio by actuation of any one of a group of transmission gearing controlling clutches usually consisting of reaction brake bands associated with and controlling the rotation of corresponding drums or similar elements of the various planetary gear trains.

One object of my invention resides in the provision of improvements in the braking means for establishing the reactionary rotary control for one or more of the gear sets of a planetary type transmission. While this feature of my invention is not necessarily limited in the application thereof to planetary transmissions, it has particular significance when applied to the rotary controlling elements of such transmissions since my invention provides for improved distribution of braking effort to the rotary drums. Difficulty has been experienced in planetary transmissions in connection with objectionable tendency toward displacement of the axis of the rotary drum when the braking effort is applied thereto to obtain a driving ratio through the gear box. My invention tends to remove such difficulties by providing a braking mechanism adapted to substantially balance the braking forces circumferentially around the drum without the aforesaid tendency toward objectionable displacement of the drum axis.

A further object of my invention resides in the provision of braking means having improved efficiency, especially in connection with drums of planetary transmissions; the braking means being further improved from the standpoints of simplicity, ease of service for making repairs, and ability to assemble and operate the braking mechanism within the limited space ordinarily available in gear boxes of the types referred to.

Another object of my invention resides in the provision of an improved selector and actuating mechanism for obtaining the several speed ratios provided by the transmission or other speed changing mechanism, the latter preferably being of the planetary gear type although not necessarily limited thereto in the broader aspects of my invention.

In carrying out the above objects of my invention, I have provided a common actuator or prime mover which may be of the fluid pressure type for applying the necessary force to the braking devices in order to control the rotation of the desired drum of the planetary gearing, a selector mechanism being provided under manual control of the vehicle driver for selectively causing the common actuator to apply a braking force to the proper drum.

A further object of my invention resides in the provision of improved controls and actuating mechanism for selecting and manipulating the various gear trains of a transmission, particularly a planetary type of transmission whereby means is provided responsive to the manual selector for automatically bringing about a complete cycle of gear ratio change. Thus, in one embodiment of my invention I have provided fluid pressure actuating means responsive to operation of the manual selector for first releasing the rotary drum of one of the planetary gear trains and then braking another drum associated with the transmission for establishing a further gear ratio drive to the motor vehicle.

Where the aforesaid common actuator for the braking devices is employed, this actuator may be of the fluid pressure type adapted for operation by oil pressure, air pressure either above or below atmospheric pressure, or other equivalent systems. I prefer, according to the teachings of this phase of my invention, to provide for energizing the actuator by oil pressure.

A further object of my invention resides in the provision of improved means for applying the braking force selectively to the various braking devices of the planetary gear trains, this means preferably being in the form of a toggle mechanism whereby for a relatively small amount of movement I am enabled to positively and rapidly produce the desired manipulation of the braking devices and with the desired amount of pressure applied to the various rotary drums. A further feature of this phase of my invention resides in the provision of a single toggle bus bar mechanism for selectively actuating the speed ratio brake controlling devices of the transmission.

A still further object of my invention resides in the provision of improved fluid pressure means for actuating the various transmission controlling devices, this means including a displacement piston or other equivalent device associated with the main pressure cylinder and operating to reduce the amount of fluid necessary to cause actuation of the transmission mechanism and also to effect a very rapid transmission gear change in response to operation of the manual selector.

A still further object of my invention resides in the provision of improved means for automatically maintaining the desired amount of clearance between a rotary drum and the braking mechanism associated therewith, particularly in connection with a planetary type transmission although not necessarily limited thereto. This feature of my invention has particular significance in connection with the toggle brake applying mechanism since, by maintaining the aforesaid clearance within narrow limits, I am enabled to maintain the proper braking action with a relatively small amount of travel in the toggle mechanism or other pressure means for actuating the braking device.

A planetary type of transmission presents a number of advantages over the more conventional sliding gear types of transmissions, and my invention is therefore primarily directed toward planetary types of transmissions and power transmission systems employing planetary gearing speed ratio controlling devices although, as aforesaid, the fundamental principles of my invention may, if desired, be employed in connection with transmissions of other types including the aforesaid sliding gear types of transmissions. By way of example in connection with the aforesaid advantages of the planetary transmission over more conventional types, it may be noted that the planetary transmission permits gear changes without the necessity of releasing the main clutch between the engine and transmission so as to obtain relatively quick gear changes and faster acceleration of the motor vehicle. This is made possible by reason of the fact that the braking devices associated with the respective planetary gear trains are, in effect, clutches in that each rotary drum controlling a planetary gear train is frictionally engaged by its associated braking means.

Further objects and advantages of my invention will be apparent from the following detailed description of one illustrative embodiment of the principles of my invention, reference being had to the accompanying drawings, in which;

Fig. 1 is a side elevational view illustrating my power transmission mechanism as a whole, portions of the transmission and clutch casings being broken away to illustrate the gear train controls and main clutch parts respectively.

Fig. 2 is a plan view partly in section illustrating the manually controlled selector mechanism for controlling the transmission gear ratio setting.

Fig. 3 is a sectional elevational view through the transmission and illustrating one of the planetary transmission speed ratio brake controlling devices and actuating mechanism therefor, the section being taken along the line 3—3 of Fig. 1.

Fig. 4 is a fragmentary sectional elevational view of the mechanism illustrated in Fig. 3 but showing the toggle bus bar mechanism in the released position.

Fig. 5 is a plan view partly in section illustrating the toggle bus bar mechanism of Fig. 3, the section being taken along the line 5—5 of Fig. 3.

Fig. 6 is a sectional elevational view through the power transmitting mechanism between the main clutch and transmission, the section being taken along the line 6—6 of Fig. 1 and illustrating the fluid pressure mechanism for actuating the bus bar through its oscillatory cycle of operation.

Fig. 7 is a detail sectional view along the line 7—7 of Fig. 6 illustrating the fluid pressure control valve for the operating cylinders of the bus bar.

Fig. 8 is a plan view partly in cross section along the line 8—8 of Fig. 3 illustrating the clearance take-up device for the braking mechanism.

Fig. 9 is a sectional elevational view along the line 9—9 of Fig. 3 also showing the clearance take-up device illustrated in Fig. 8.

Referring to the drawings, I have illustrated my invention in connection with a motor vehicle drive, this drive including a prime mover or engine A, a portion of which is shown in Fig. 1, a clutch B driven from the engine, and a change speed transmission or gear box C driven from the clutch B. The drive passes from the transmission through a power take-off shaft 10 which, as usual, may extend rearwardly of the vehicle to drive the usual rear ground wheels (not shown).

The clutch B may be of any suitable construction for controlling the drive between engine A and transmission C, this clutch being illustrated in Fig. 1 in the form of a fluid type having the usual driving and driven cooperating vane members 11 and 12 respectively. The driving vane member 11 is carried by the engine flywheel 13 and the driven vane member 12 is secured to the power shaft 14 shown in Fig. 6, this power shaft extending rearwardly to drive the various gear trains of transmission C. I have illustrated a fluid type of clutch since a clutch of this character has a number of advantages in connection with a transmission of the planetary gear type C. Thus, the fluid type of clutch is desirable in providing a smooth drive for the vehicle through the planetary transmission, relatively high power driving efficiency, automatic release of the drive between the engine and transmission when the engine is idling and with the transmission manipulated to establish one of its driving gear ratio settings, and other well-known favorable characteristics.

I have illustrated the change speed transmission C as the epicyclic or planetary type, this general form of transmission being well known in the art and, as usual, includes a plurality of transmission speed ratio controlling clutches or brakes 15, 16, 17, and 18, these braking devices being respectively adapted to actuate the transmission in its first speed ratio or low gear, second speed ratio or intermediate gear, third speed ratio, and reverse drive.

The typical brake device 17 illustrated in Fig. 3 consists of an outer band 19 which is somewhat flexible and which extends substantially circumferentially of drum 20 so as to position the ends 21 and 22 thereof adjacent each other. This band 19 encloses a flexible segmental shoe 23 freely movable therewithin, the segmental shoe preferably extending substantially half way around drum 20 from the end 21 of the band, this segmental shoe having attached thereto a suitable friction braking material 24 for braking engagement with drum 20. The end 21 of band 19 is provided with a threaded actuating flange 25 and the end 22 is flanged to receive an anchor pin 26 carried by a link 27 pivotally supported at 28 to the housing 29 of transmission C. The shoe 23 is anchored by a flange 30 pivoted at 31 with a link 32, the latter being pivotally supported at 33 with the aforesaid casing 29 of the transmission.

Located within the band 19 and also relatively movable therewithin, I have provided a second segmental flexible shoe 34 having attached thereto the brake lining material 35 engageable with drum 20, the shoe 34 having one end thereof provided with an anchoring flange 36 engaged by the aforesaid pin 26. The other end of the substantially semicircular shoe 34 lies within band 19 and adjacent to the anchored end of the first segmental shoe 23 as illustrated in Fig. 3. Yieldingly urging the band 34 away from drum 20 is a spring 34$^a$ acting between the transmission casing and the last mentioned end of band 34.

In Fig. 3 the third speed ratio braking device 17 is illustrated in its actuating position wherein the drum 20 is held against rotation, the driven shaft 10 in such instance being operated through the planetary gearing 37 somewhat diagrammatically illustrated in Fig. 3 in association with the drum 20. It will be readily understood that, according to well-known practice, when the drum 20 is released the planetary gearing 37 will cause rotation of drum 20 and the driven shaft 10 will no longer be operated in the third speed ratio under control of the braking device 17. When the operating flange 25 of band 19 is forced upwardly as viewed in Fig. 3 by the band operating mechanism which will be presently described, the band 19 is contracted so as to cause the brake linings 24 and 35 of the shoes 23 and 34 respectively to engage drum 20 and hold the drum against rotation. By reason of the arrangement of the segmental shoes and the anchoring provided therefor, the braking forces applied to the drum will be substantially balanced against a tendency toward transverse loading of the drum and hence the planetary gears associated therewith.

On release of the braking force applied to the band 19, the inherent resilience of the band and the shoes 23 and 34, assisted by spring 34$^a$, will separate the brake linings from the drum although, if desired, one or more springs may be suitably arranged to assist this releasing action.

I will next describe the details of construction and operation of the manually controlled selector mechanism, the selector elements operated thereby and associated with each of the speed ratio brake controlling devices, and the toggle bus bar mechanism for operating the selector elements.

Referring to Figs. 1 and 2 I have illustrated a portion of the usual vehicle steering wheel 38 mounted on the steering post 39, the steering post providing a convenient location for the manually operated selector controlling device although it will be understood that if desired this device may be located at other convenient points for operation by the vehicle driver. A selector segment 40 is suitably clamped at 41 to the steering post 39, the segment 40 having a plurality of arcuately spaced stops or notches 42, 43, 44, 45, and 46, adapted for selective engagement by a manually operated selector arm or lever 47, this selector arm preferably having sufficient resilience to permit the vehicle operator to spring the arm in shifting or moving the arm from one of the aforesaid notches into engagement with another. The selector arm 47 is journaled in the segment 40 as indicated at 48, the arm having a shaft 49 actuated thereby and extending downwardly along the steering post 39. The lower end of shaft 49 is journaled at 50 and carries fixed thereto a bevel gear 51 meshing with a gear 52 attached to the longitudinally rearwardly extending shaft 53.

As will be presently apparent, the transmission C is manipulated into its gear ratio settings for first speed, second speed, third speed, reverse, and neutral, when the selector arm 47 is respectively engaged with the aforesaid notches 42, 43, 44, 45, and 46.

Referring now particularly to Figs. 3, 4, and 5, it will be noted that the rearward extension of shaft 53 forms a cam shaft 54, this selector cam shaft being provided with a plurality of longitudinally spaced selector cams 55, 56, 57, and 58 adapted respectively to operate selectors elements D, E, F, and G when the selector arm 47 is engaged with notches 42, 43, 44 and 45. Cams 55, 56, 57, and 58 are thus respectively the first speed cam, second speed cam, third speed cam, and reverse cam. Likewise selector elements D, E, F, and G are respectively the first speed selector element, second speed selector element, third speed selector element, and reverse selector element.

Inasmuch as each of the selector elements D, E, F, and G is similar in construction and operation, I have illustrated the details of only one of these selector elements F in Figs. 3 and 4, it being understood that the remaining selector elements are adapted to function in a manner corresponding to that which will be described in connection with this third speed selector element F.

The selector element F is provided with a head 59 having an arcuate cam face 60 adapted for engagement with the third speed cam 57. Attached to head 59 is a rod 61 journaled in an opening 62 of the toggle bus bar actuated lever H, the latter being in the form of a block or casting slidably carrying the selector elements. The rod 61 is formed at its inner end with a block or head 63 slidably supported on the upper face of a finger 64 projecting inwardly as a part of the toggle lever H. The upper face of the head 63 is recessed at 65 to receive the third speed brake actuating finger 66. The finger 66 extends upwardly to provide a socket portion 67 which receives the ball end 68 of the threaded shaft 69, the latter engaging the aforesaid threaded portion of the flange 25 of the third speed brake band 19. The shaft 69 has the band clearance take-up device J associated therewith, the details of which will be presently described.

Surrounding the rod 61 of selector element F is a spring 70, this spring reacting against the toggle lever H at one end thereof and having its other end yieldingly urging the head 59 outwardly and thereby tending to position the head 63 in contact with the face 71 of the toggle lever adjacent the inner end of finger 64. In Figs. 3 and 4 the third speed cam 57 is illustrated as having actuated the selector element F inwardly of the toggle lever H so as to compress spring 70 and space the block or head 63 inwardly from the face 71 of the toggle lever, this being the position of selector element F for engaging the finger 66 of the third speed braking device 17 as will be presently apparent.

In Fig. 5 the selector elements D, E and G are respectively provided with the outer cam engaging heads 59$^a$, 59$^b$, and 59$^c$, and also with the inner blocks or heads 63$^a$, 63$^b$, and 63$^c$, the latter being respectively formed with recesses 65$^a$, 65$^b$, and 65$^c$ for engagement respectively with the first speed actuating finger 66$^a$, the second speed actuating finger 66ᵇ, and the reverse actuating finger 66ᶜ.

Associated with each of the brake actuating fingers is a spring 71ᵃ and in Figs. 3 and 4 one of these springs is illustrated in association with the third speed finger 66. The spring 71ᵃ is anchored to a bracket 72 depending from the take-up bracket 73, the latter bracket extending longitudinally along the transmission and connected to the casing portion thereof by suitable fasteners 74 illustrated in Fig. 3. The spring 71ᵃ acts on finger 66 to yieldingly urge the finger outwardly to the position thereof illustrated in Fig. 4 whereby the lower end of the finger will readily enter the recess 65 of block 63 when the selector element F is urged inwardly under the influence of the third speed cam 57. When the finger 66 is in the said Fig. 4 position, such outward movement is limited by engagement of the finger with a suitable opening 75 formed in the aforesaid bracket 73. It will be understood that a corresponding opening 75 is provided with each of the fingers 66ᵃ, 66ᵇ, and 66ᶜ.

The toggle lever H is pivotally supported from the casing of the transmission at opposite longitudinally spaced sides of the lever by reason of pivot shafts 76 and 77 best shown in Fig. 5. Spaced longitudinally inwardly from these pivoting shafts the lever H is formed with a pair of guides or tracks 78 and 79 respectively receiving the actuating rollers 80, 81 respectively journaled on shafts 82, 83 carried by the upwardly extending toggle links 84, 85. These toggle links have their lower ends fixed to a power operated bus bar 86 suitably journaled in the sides of the transmission casing and also at intermediate points such as at 87 in Fig. 4, the bus bar 86 being operated in a manner which will be presently apparent. In Fig. 3 it will be apparent that the bus bar has actuated the toggle lever H through the intermediary of the toggle links 84, 85 into the operating position while in Fig. 4 the solid line position of the selector element therein illustrated shows the toggle lever H in the inoperative position.

In operation of the mechanism as thus far described, omitting for the present the power means for oscillating the bus bar 86 in response to manual operation of the selector arm 47, let it be presumed that the operator has just moved the selector arm 47 into engagement with the third speed notch 44 of selector segment 40. Let it be furthermore presumed for purposes of illustration that the selector arm 47 was in engagement with the second speed notch 43 just previously to its movement into engagement with the third speed notch 44. When the selector arm 47 is in engagement with the second speed notch 43, the toggle lever H is in the actuated position shown in Fig. 3, the second speed cam 56 having moved the second speed selector element E inwardly against its associated spring 70 so that the second speed block 63ᵇ will urge the second speed finger 66ᵇ upwardly to actuate the second speed braking device 16. Under such conditions, the motor vehicle will be driven through the transmission C in the second speed ratio, all of the selector elements with the exception of the second speed selector element E being free from engagement with their respective actuating cams so that these remaining selector elements have their blocks urged outwardly by their associated springs 70 so as to position their respective actuating blocks against the face 71 of toggle lever H. It will thus be apparent that when the toggle lever H is swung from the position shown in Fig. 4 to the position shown in Fig. 3, only the second speed braking device will be operated. Carrying forward the assumed illustration wherein the operator now moves the selector arm 47 from the second speed notch 43 into engagement with the third speed notch 44, the selector cam shaft 54 is thereby rotated in a clockwise direction as viewed in Figs. 3 and 4 so as to move the second speed cam 56 away from contact with the second speed selector element 56 and to move the third speed cam 57 into engagement with the third speed selector element F. This manual operation of the selector arm 47 will ordinarily take place in advance of movement of the bus bar 86 in response to operation of the selector arm 47 so that while the second speed braking device 16 is still in operation the third speed selector element F is urged inwardly with the toggle lever H in the operated position shown in Fig. 3. When the third speed selector element F is thus moved inwardly, the block 63 thereof strikes the downwardly extending end of the third speed pin 66 which is rocked inwardly to the dotted line position shown in Fig. 4, spring 71ᵃ yieldingly permitting this swinging movement of the pin. The bus bar 86 is then rotated in a clockwise direction as viewed in Figs. 3 and 4 so as to swing the toggle lever H on its pivots 76, 77 from the position illustrated in Fig. 3 to that shown in Fig. 4. This swinging movement of the toggle lever into its inoperative position releases the second speed selector element E from pressure operation on the second speed pin 66ᵇ and the spring 70 associated with the second speed selector element will then operate to move the second speed selector element outwardly so as to position the block 63ᵇ thereof outwardly into its inoperative position in engagement with the face 71 of the toggle lever. Furthermore when the toggle lever H is moved to the Fig. 4 position it will be apparent that the third speed block 63 is carried downwardly away from contact with the third speed finger 66 so that spring 71ᵃ will swing the pin 66 from the dotted line position shown in Fig. 4 to the solid line position illustrated therein. The parts are then as illustrated in the solid lines of Fig. 4. The bus bar 86 will then move into the operating position so as to swing the toggle lever H from the Fig. 4 position to the Fig. 3 position, the third speed finger 66 being received in the recess 65 of the third speed block 63 so that the finger 66 is urged upwardly to contract the third speed brake band 19 and apply the third speed braking device 17. During this operation of the toggle lever H, it will be apparent that the third speed selector element F remains in engagement with the third speed cam 57 and the motor vehicle is then operated in the third speed driving ratio through transmission C.

From the foregoing illustration of the cycle of operation in moving the selector arm 47 from the second speed notch 43 into engagement with the third speed notch 44, it will be apparent that a similar operation takes place whenever the selector arm 47 is adjusted from one of the notches of selector segment 40 into engagement with another of the notches thereof and the transmission C is thereby under control regarding its driving speed ratios to the desires of the motor vehicle driver. It will be readily understood that when the selector arm 47 is moved an amount greater than the distance between adjacent notches, the transmission will respond accordingly. For example, the selector arm 47 may be moved directly from engagement with the third speed notch 44 into engagement with the first speed notch 42, the transmission being thereby manipulated from the third speed driving ratio directly into the first or low speed ratio, the mechanism not having time to actuate the second speed braking device where the selector arm is quickly moved between notches 44 and 42.

When the selector arm 47 is adjusted into the neutral notch 46, the selector cam shaft 54 is moved so as to bring the neutral space 88 between cams 55 and 56 opposite the outwardly extending ends of the selector elements, it being apparent that none of the cams of the selector cam shaft 54 will then engage the selector elements. Thus, under such conditions, none of the braking devices will be operated and there will not be any drive through the transmission.

When the motor vehicle driver desires to operate the vehicle in reverse, he adjusts the selector arm 47 into engagement with the reversing notch 45 so as to actuate the reverse selector element G by engagement with the reverse cam 58, the toggle lever H being operated to actuate the reverse braking device 18 in a manner which will be readily apparent.

I will next describe the power means for automatically oscillating the bus bar 86 whenever the selector arm 47 is moved from one of the notches of segment 40 into engagement with another of the notches thereof. This mechanism is best illustrated in Figs. 6 and 7 wherein it will be noted that one end of the bus bar 86 (see also Fig. 5) projects outwardly from the casing of the transmission to receive a lever assembly fixed to the bus bar. This lever assembly comprises an operating lever 89, a releasing lever 90, and a valve controlling lever 91, these three levers operating as a unit with the bus bar 86.

A fluid pressure operating cylinder 92 is secured to the transmission casing as shown Fig. 5, this cylinder slidably receiving a displacing piston 93 yieldingly urged downwardly by a spring 94, the cylinder also receiving a fluid pressure operated piston 95 which is separate from the displacing piston 93 but in position for actuation thereby as will be presently apparent. The piston 95 is connected with a piston rod 96 which extends downwardly through cylinder 92 for pivotal connection at 97 with the yoked end of lever 89. The piston 93 operates within a bore 98 which is of lesser diameter than the bore 99 for accommodating the piston 95, thereby providing a fluid pressure space 100 having an opening 101 in communication with a conduit 102, the latter extending to the port 103 of valve casing 104 illustrated in Fig. 7.

The bore 98 also has an opening slidably receiving a plunger detent 105 the outer end of which is provided with a head 106 slidable in a chamber 107, a spring 108 acting on the head 106 so as to yieldingly urge the detent 105 outwardly in the chamber 107. The chamber 107 is open to conduit 102 by a branch 109 of the latter as shown in Fig. 6. The inner end of detent 105 is provided with a tooth 110 engaging the ratchet teeth or rack 111 formed longitudinally along the outer face of piston 93.

The main casing 29 of transmission C is open along one side thereof, this opening being normally closed by a cover housing 112 best shown in Fig. 3, the cover being secured by fasteners 113 to the main casing 29. The cover 112 may also be provided with a longitudinally extending opening 114 normally closed by a cover plate 115 removably secured by fastener 116 to the cover 112, the plate 115 permitting ready inspection and minor repairs of the selector operating mechanism contained within the cover housing 112. A portion of the cover housing 112 is shown in Fig. 7, this housing being formed with an outwardly extending valve casing 117 cooperating with the aforesaid casing portion 104 to receive and house a valve K operable therewithin. This valve K is journaled at its lower end by a shaft 118 integral with the valve and extending outwardly through casing 104 for fixed connection with a downwardy extending valve operating lever 119 best shown in Fig. 6. The valve K is also journaled by a trunnion 120 coaxial with shaft 118, the trunnion 120 being journaled in an inwardly extending boss 121 formed as a part of housing 112. The boss 121 has a fluid inlet 121a threadedly receiving one end of a fluid pressure supply conduit 122. The boss 121 has an annular passage 121b surrounding the trunnion 120, the passage 121b being open to the inlet 121a.

The valve trunnion 120 has openings 121c communicating with the annular passage 121b and is bored to provide a fluid conduit 123 open to the openings 121c and also to a conduit 124 formed in the stem 125 of the valve. The fluid pressure admitted to conduit 123 is thus balanced on the trunnion 120. The valve K is provided with a distributing head 126 having a fluid outlet 127 open to the conduit 124 and in Fig. 7 this outlet is illustrated in communication with the port 103. The reaction of the pressure of the fluid in passing through the outlet 127 of valve K may be balanced by an opening 128 equal in area to the outlet 127. The valve head 126 bears against the cover 112 and the fluid pressure acts through opening 128 against this cover in opposition to the reaction of the fluid pressure at the outlet 127. The valve K may thus be oscillated substantially free from reactions of the fluid pressure.

The valve K is adapted for oscillation between two positions, one of its positions in communication with conduit 102 being illustrated in Figs. 6 and 7. In its other position of movement, the valve K is moved clockwise as viewed in Fig. 6 on its pivotal support provided by trunnion 120 and shaft 118 so as to align the outlet 127 with a further conduit 131, the latter extending for communication with the upper end of a releasing cylinder 132. Before describing this releasing cylinder it will be noted from Fig. 7 that the housing 112 is provided with an opening 133 which places the valve casing in communication with the interior of housing 112, the latter being open to an oil containing reservoir or sump 134 best shown in Figs. 1, 3, and 6. The reservoir 134 is adapted to contain a supply of suitable fluid such as oil adapted to be distributed by valve K to the cylinders 92 and 132 and also for lubricating the mechanism of the transmission C.

Extending upwardly from the valve casing 117 is a detent housing 129 receiving a spring 130 adjustable at one end by a screw 130a. The other end of the spring yieldingly urges a detent 130b inwardly of the valve casing for contact with the upper rounded end of valve K when the valve is oscillated between its positions of registration with port 103 and conduit 131. This detent 130b serves to assure movement of the valve into its final positions of movement after actuation to just beyond the mid-point in the valve travel, the spring pressed detent forcing the valve to complete its swinging movement.

The releasing cylinder 132 is supported by the housing 112 as seen in Fig. 5, this cylinder receiving a reciprocating piston 135. The piston operates a piston rod 136 which extends downwardly through the cylinder for pivotal connection at 137 with the yoked end of lever 90.

As best shown in Fig. 6 the conduit 122 extends into communication with a fluid pressure producing pump L which is adapted to draw oil from the reservoir 134 and supply the oil under pressure to the conduit 122. The pump L is driven from a suitable source of power provided by the mechanism operated from engine A, the arrangement illustrated in Fig. 6 comprising a driving gear 138 mounted on shaft 14 meshing with a driven gear 139, the latter being adapted to actuate a shaft (not shown) extending downwardly in the shaft housing 140 for driving the pump L. Instead of driving the pump L from the driven shaft of clutch B, the pump may be operated from the driving portion of the clutch B so that the pump is driven when engine A is idling and the drive is not being transmitted through the clutch, such arrangement being shown in my copending application Serial No. 708,234, filed January 25, 1934.

In order to operate the valve K through a complete cycle of its oscillatory movement in response to adjustment of the selector arm 47, the shaft 53 which is connected to the selector cam shaft 54 is provided with a cam carrying valve actuating segment 141 best shown in Figs. 5 and 6. This segment is secured to shaft 53 by a set screw 142 shown in Fig. 5, the segment having a series of circumferentially spaced alternating depressions or notches and cams adapted for controlling movement of a cam follower 143 formed as a part of lever 119. Thus, the valve actuating segment 141 is provided with a series of notches 144, 145, 146, 147, and 148 which respectively receive the cam follower 143 when the selector arm 47 is in engagement with notches 42, 43, 44, 45, and 46 of the selector segment 40. Adjacent notches are separated by cams, these cams being indicated at 149, 150, 151, and 152.

The lower end of lever 119 engages a reciprocating plunger 153 horizontally disposed for sliding action in a guide 154 supported by housing 112, the plunger 153 projecting from guide 154 for contact with the end 155 of the lever 91.

In operation of the fluid pressure operating mechanism just described and best illustrated in Figs. 6 and 7, it will be noted that the parts are illustrated in the position corresponding to adjustment of selector arm 47 into engagement with the third speed notch 44 as shown in Fig. 2, the bus bar 86 being operated into the position shown in Fig. 3. In this position the third speed braking device 17 is being actuated so that the motor vehicle is driven in the third speed driving ratio through transmission C. The bus bar 86 is being actuated through lever 89 and piston rod 96, the latter being depressed by fluid pressure delivered from valve K through conduit 102 into the cylinder chamber 100 for action on the piston 95. It will also be noted that the fluid pressure of conduit 102 is open through the branch conduit 109 to the chamber 107 so that the detent 106 is urged inwardly against its spring 108 for engaging the tooth 110 with rack 111 whereby piston 93 is maintained in its downward position and against retraction under the influence of fluid pressure in the cylinder space 100. It will also be noted that the conduit 131 between valve K and releasing cylinder 132 is not in communication with the delivery conduit 127 of the valve, the conduit 131 being open to the valve chamber and thus by reason of opening 133 with the reservoir 134. It will furthermore be noted that the cam follower 143 which controls the position of valve K is in engagement with the third speed notch 146 of the valve actuating segment 141.

The operation of the fluid controlling mechanism can best be set forth by assuming a condition of adjusting the selector arm 47 and for this purpose let it be presumed that the selector arm is moved from notch 44 into engagement with the second speed notch 43 of selector segment 40. When the selector arm is thus moved, it will be apparent that the valve actuating segment 141 is rotated in a counterclockwise direction as viewed in Fig. 6 so that ultimately the second speed notch 145 thereof is brought into engagement with the cam follower 143. During the first part of this movement of segment 141, the cam 150 will act on the follower 143 so as to swing the lever 119 to the left as viewed in Fig. 6, the valve K being thereby rotated sufficiently to move the outlet 127 from engagement with port 103 and into alignment with the conduit 131, the detent 130ᵇ assisting this valve movement.

When the valve K moves away from port 103 it will be apparent that the fluid pressure is relieved in conduit 102, the spring 108 being free to act on detent 105 which is thereby moved outwardly so as to withdraw the tooth 110 from engagement with piston rack 111. Furthermore, as lever 119 is swung by the cam 150, the plunger 153 is moved to the left as viewed in Fig. 6 into contact with the end 155 of lever 91.

When the valve K is thus moved to place the delivery conduit 127 thereof into communication with the conduit 131, it will be apparent that the fluid pressure from pump L and supply conduit 122 will pass to the releasing cylinder 132 for action on piston 135, the latter being thereby moved downwardly in cylinder 132 so as to swing lever 90 and bus bar 86 in a clockwise direction as viewed in Fig. 6. This clockwise swinging movement of the bus bar actuates the toggle lever H from the position thereof illustrated in Fig. 3 into the released or inoperative position shown in Fig. 4. Thus, it will be noted that when the selector arm is manipulated, the toggle lever H is moved into its releasing position so as to clear the bus bar from engagement with any operating finger of the transmission brake controlling devices which was previously being actuated.

Meantime, the cam 150 has been moved beyond the cam follower 143 so that the second speed notch 145 will be positioned opposite the cam follower 143. As the bus bar 86 is moved into its releasing position, the lever 91 will be operated to cause the end 155 thereof to move the plunger 153 to the right as viewed in Fig. 6, thereby restoring the lever 119 and valve K to the position shown in Fig. 6, the cam follower 143 now engaging the second speed notch 145 of the valve actuating segment 141.

When the valve K is thus restored to the position shown in Figs. 6 and 7, the conduit 131 will be opened to reservoir 134 by reason of the opening 133 and the fluid pressure thereby admitted to conduit 102 will operate the pressure cylinder 92 as follows. Retracing the operation for the moment, when the releasing piston 135 operates to actuate the bus bar 86 to the inoperative position of Fig. 4, it will also be apparent that lever 89 will be moved in a clockwise direction as viewed in Fig. 6 so as to move the piston 95 upwardly in the cylinder bore 99. This upward movement causes piston 95 to engage piston 93 and also move the latter piston upwardly and compressing spring 94, it being remembered that the detent 105 was released from rack 110 so as to permit this return movement of piston 93. Thus, pistons 95 and 93 are both moved upwardly simultaneously when the releasing piston 135 has its actuating downward stroke, this downward stroke being immediately followed by a release of the fluid pressure in conduit 131 and an application of this fluid pressure to the conduit 102.

When the fluid pressure is admitted to the conduit 102 and the pressure is released in conduit 131, it is apparent that the spring 94 is then free to act on piston 93 so as to quickly depress this piston together with the piston 95 until the fluid pressure admitted through conduit 102 into the cylinder space 100 has built up sufficiently under the rapidly decreasing volume caused by the downward movement of the displacing piston 93. The fluid pressure when admitted to conduit 102 also acts on the detent 105 so as to compress the spring 108 and cause the tooth 110 to engage the piston rack 111, it being apparent that the piston 93 can move downwardly although the tooth 110 will prevent upward movement of piston 93 as long as the fluid pressure is existent in the conduit 102.

As the fluid pressure builds up in the cylinder space 100, the piston 93 will tend to move upwardly but this upward movement will be prevented by the aforesaid detent 105, the fluid pressure then causing the piston 95 to separate from the piston 93 and move downwardly during its actuation of the bus bar 86 in a counterclockwise position which moves the toggle lever H through links 84, 85 from the position of Fig. 4 into the operative position of Fig. 3. It will thus be apparent that when the bus bar is moved into its operative position in applying pressure to one of the speed ratio braking devices, the first part of the movement is caused by the influence of spring 94 acting on the displacement piston 93 and thereby on the piston 95, the fluid pressure as it builds up then acting on the piston 95 to complete the operating stroke of the bus bar 86. In this manner the bus bar is very quickly operated since it is not necessary for the fluid pressure from conduit 102 to build up in the operating cylinder 92 in order to provide sufficient pressure to operate the piston 95.

By reason of the foregoing detailed outline of the operation, it will be apparent in the assumed illustration that the movement of the selector arm 47 from notch 44 into engagement with the second speed notch 43, has caused the third speed cam 57 to move away from the third speed selector element F and has brought the second speed cam 56 into operation with the second speed selector element E, the toggle lever H having been automatically retracted to the Fig. 4 position so as to release the first speed braking device 17, the toggle lever H having been then automatically moved into its operative position shown in Fig. 3 in applying the second speed braking device 16.

Each time the selector arm 47 is moved from one of its associated notches of selector segment 40 into an adjacent notch, it will be apparent that one of the cams of the valve actuating segment 141 will trip the valve actuating lever 119 so as to cause the bus bar 86 to actuate under power through a complete cycle of releasing any speed ratio brake controlling device which was previously in operation and to also actuate one of these devices according to the adjustment of the selector arm 47.

When the selector arm 47 is adjusted so as to bring the neutral notch 148 of segment 141 into association with the cam follower 143, the bus bar 86 will also go through a cycle of oscillatory movement but, since the neutral space 88 indicated at Fig. 4 is then brought opposite the selector elements, it will be apparent that the toggle lever H will move to clear the various fingers for operating the braking devices but when the toggle lever is moved into its operative position, none of these fingers will be operated.

When the selector arm 47 is moved into engagement with the reverse notch 45 of selector segment 40, it will be apparent that the reverse notch 147 of valve actuating segment 141 will be brought into engagement with the cam follower 143, cam 152 of segment 141 providing the necessary control of bus bar 86 so as to operate the reverse braking device 18.

I will next describe my improved brake shoe clearance take-up mechanism J best illustrated in Figs. 4, 8, and 9, it being understood that one of these mechanisms is preferably arranged in the line of pressure application between each of the selector elements and the speed ratio brake controlling devices. In Figs. 4, 8, and 9 I have illustrated one of these mechanisms J in detail and the following description of this mechanism in association with the third speed selector element F and the third speed brake controlling device 17 will serve to illustrate the corresponding take-up device in association with each selector element.

The threaded shaft 69 at a portion thereof intermediate the ball end 68 and the flange 25 of brake band 19, is provided with an integral hub 156 provided with a circumferential series of axially extending openings 157 adapted to closely receive the respective coil springs 158. Surrounding the periphery of hub 156 and also housing the springs 158 is an adjusting casing 159 provided with an outwardly extending lever arm 160. The lever 160 projects into an opening 161 of bracket 73 and arranged in the path of movement of lever 160 for adjustable contact with one edge 160ª thereof is an adjustable abutment 162 threadedly engaging the portion 163 of bracket 73, the abutment 162 being secured in its position of adjustment by the locking nut 164. The abutment member 162 has a conical guide face 165 which acts as a cam guide for the edge 160ª of lever 160. The opposite edge 160ᵇ of lever 160 is guided during its upward movement by the side 166 of opening 161, the side or guide 166 extending upwardly and then laterally by a portion 167 which is parallel with the line of contact between the side 160ª and the conical cam face 165 of the abutment member 162.

The operation of the take-up mechanism J is as follows: With the parts positioned as shown in Fig. 4, it will be noted that the brake band 19 is free from contact with the associated drum 20, the resilience of band 19 acting to expand the band and thereby move the band flange 25 to its lowered position. When the toggle lever H is moved toward the Fig. 3 position thereof, the finger 66 is moved upwardly and hub 156 is also carried upwardly in contracting the band 19. In the event that excessive clearance develops beyond a predetermined amount which is initially set to best accommodate the movement of the toggle lever H, it will be apparent that in such event the finger 66 will have a somewhat greater upward movement than will normally occur thereby causing lever 160 to be moved along the cam face 165 while the shaft 69 is being moved near the upper limit of its travel in applying the braking device 17. In Fig. 9 I have illustrated this condition, it being apparent that the lever 160 will be moved to the left as viewed in Fig. 9, such movement being accommodated by the inclined side 167 which is thereby vertically overhung by the side 160ᵇ of lever 160.

When lever 160 is shifted during the brake applying movement of shaft 69, the pressure exerted by the toggle lever H and the flange 25 will be sufficient to prevent rotation of shaft 69 under the influence of the friction established by springs 158 acting on the lever housing 159. Thus, this shifting movement of lever 160 causes the housing 159 to be slightly rotated an amount corresponding to the shifting of lever 160, the housing 159 slipping on the ends of spring 158.

When the toggle lever H is released and the pressure on the shaft 69 is thereby relieved, the band 19 expands and the flange 25 moves downwardly so as to cause the edge or side 160ᵇ of lever 160 to contact with the inclined side 167 and thereby shift the lever 160 to the right as viewed in Fig. 9 back to its original position prior to contacting with the cam face 165 on the upward movement of the lever. When this return movement of lever 160 takes place, the friction established by springs 158 is sufficient in the absence of pressure on finger 66 to rotate housing 159 and hub 156 as a unit, the direction of the threads of shaft 69 causing the shaft to move downwardly relative to the flange 25. The effect of this adjustment is to bring the finger 66 closer to the actuating head 63 of selector element F so that the next time the toggle lever H is actuated, the braking device 17 will be actuated earlier in the upward movement of shaft 69 than before. Furthermore, after the clearance has been taken up in this manner, the lever 160 merely engages the cam face 165 but does not move upwardly sufficiently to cause a shifting movement of lever 160 until such time as the brake lining 24 and 35 becomes sufficiently worn to develop further clearance in which case the clearance is taken up as described before.

It will be understood that the illustration in Fig. 9 is somewhat exaggerated since ordinarily the clearance will be taken up in very small increments as it develops during operation of the braking device 17. It will be apparent that the friction connection between the housing 159 and the hub 156 is in the nature of a friction ratchet-like mechanism or one-way clutch, these parts relatively slipping during the brake applying action whenever clearance is to be taken up, and being frictionally connected together so as to rotate as a unit during the brake releasing action.

It will furthermore be noted that by reason of my having provided a separate clearance take-up mechanism J associated with each of the speed ratio brake controlling devices, I am enabled to maintain the desired amount of clearance for each braking device independently of each other according to the usage of the mechanism and the amount of wear which might be experienced in one or more of the brake controlling devices more than in others.

In Fig. 3 which illustrates the operative position of the toggle lever H, it will be noted that the toggle link 84 therein illustrated is not quite in a vertical position, this preferably being the normal position of the typical toggle link when the braking device 17 is fully actuated. In the event that clearance develops in excess of that desired, the lever 160 is moved along the cam face 165, the bus bar 86 providing for such further movement by swinging the toggle links more nearly to their vertical positions under the influence of the actuating piston 95 as will be readily understood.

Various modifications and changes will be readily apparent from the teachings of my invention, as set forth in the appended claims, and it is not my intention to limit my invention to the particular details of construction and operation shown and described for illustrative purposes.

What I claim is:

1. In a motor vehicle planetary transmission having a plurality of speed ratio controlling braking devices, mechanism for selectively operating and releasing said braking devices, fluid pressure operated means for operating said mechanism, fluid pressure operated means for releasing said mechanism, and manually operated means for controlling operation of said fluid pressure means.

2. In a motor vehicle planetary transmission having a plurality of speed ratio controlling braking devices, means including an oscillatory bus bar for selectively operating and releasing said braking devices, fluid pressure operated means for rocking said bus bar in one direction for releasing said braking devices, and fluid pressure operated means for rocking said bus bar in another direction for operating said braking devices.

3. In a motor vehicle planetary transmission having a plurality of speed ratio controlling braking devices, means including an oscillatory bus bar for selectively operating and releasing said braking devices, fluid pressure operated means for rocking said bus bar in one direction for releasing said braking devices, fluid pressure operated means for rocking said bus bar in another direction for operating said braking devices, and manually operated means for selectively operably connecting said first means with said braking devices.

4. In a motor vehicle planetary transmission having a plurality of speed ratio controlling braking devices, means including an oscillatory bus bar for selectively operating and releasing said braking devices, fluid pressure operated means for rocking said bus bar in one direction for releasing said braking devices, fluid pressure operated means for rocking said bus bar in another direction for operating said braking devices, manually operated means for selectively operably connecting said first means with said braking devices, and means responsive to operation of said manually operated means for causing successive operation of the aforesaid fluid pressure operated means in the order set forth.

5. In a motor vehicle transmission having a speed ratio controlling device, a fluid pressure receiving cylinder, a piston operating in said cylinder, means actuated by said piston during its power stroke for operating said controlling device, means for supplying fluid under pressure to said cylinder for actuating said piston on its said power stroke, a displacing piston operable in said cylinder, means acting on said displacing piston independently of said fluid for supplementing the fluid pressure power stroke of said piston, and means responsive to said fluid pressure supply means for controlling operation of said displacing piston.

6. In a motor vehicle transmission having a speed ratio controlling device, a pair of fluid pressure operating devices, means alternately operated by said fluid pressure operating devices for operating and releasing said controlling device, valve means operable to alternately supply fluid under pressure to said fluid pressure operating devices, means responsive to operation of one of said fluid pressure operating devices for operating said valve means to supply fluid under pressure to the other of said fluid pressure operating devices, and manually operated means for controlling said valve means.

7. In a motor vehicle planetary gear transmission having a plurality of rotary speed ratio controlling devices, means operatively engageable with each of said controlling devices, an operating member associated with each of said engageable means for effecting engagement thereof with one of said controlling devices, means including a common power transmitting member for selectively actuating said operating members, a plurality of selector operating elements adapted to selectively provide operating connections between said common actuating member and said operating members, means for mounting said selector elements on said common operating member for selective sliding movement in the direction of their lengths into operating positions to actuate said operating members, manually controlled means acting on one end of said selector elements for selectively sliding said selector elements to move the other end thereof into said operating positions, and power operating means for actuating said common member.

8. In a motor vehicle planetary gear transmission having a plurality of rotary speed ratio controlling devices, means operatively engageable with each of said controlling devices, an operating member associated with each of said engageable means for effecting engagement thereof with one of said controlling devices, means including a common power transmitting member for selectively actuating said operating members, fluid pressure operated means for operating said common actuating member for releasing engagement of said engageable means with said controlling devices, fluid pressure operated means for operating said common actuating member for causing engagement of said engageable means with said controlling devices, and manually operated means for controlling operation of said fluid pressure means.

9. In a motor vehicle planetary gear transmission having a plurality of rotary speed ratio controlling devices, means operatively engageable with each of said controlling devices, an operating member associated with each of said engageable means for effecting engagement thereof with one of said controlling devices, means including a common power transmitting member for selectively actuating said operating members, a plurality of selector operating elements adapted to selectively provide operating connections between said common actuating member and said operating members, a plurality of fluid pressure operating means for operating said common actuating member for respectively causing engagement and release of said engageable means with respect to said controlling devices, and manually operated means for controlling operation of said plurality of fluid pressure means and said selector operating elements.

10. In a motor vehicle transmission having a speed ratio controlling device, fluid pressure operating means, means including a reciprocatory power transmitting member for operating and releasing said controlling device, valve means operable to supply fluid under pressure to said fluid pressure operating means for causing reciprocation of said power transmitting member by said fluid pressure operating means, and means responsive to movement of said power transmitting member in one of its directions of reciprocation for operating said valve means to supply fluid under pressure to said fluid pressure operating means to move said power transmitting member in its other direction of reciprocation.

11. In a motor vehicle transmission having a speed ratio controlling device, a fluid pressure receiving cylinder, means including a main piston operable during a power stroke in said cylinder for actuating said controlling device, a displacing piston operable in said cylinder, means for supplying fluid under pressure to said cylinder for operating the main piston on its power stroke, means yieldingly urging movement of said displacing piston in opposition to fluid pressure acting on said displacing piston to supplement the power stroke of said main piston, and means operating during an intermediate position of said main piston during its power stroke for preventing return movement of said displacing piston under the influence of fluid pressure acting thereon.

12. In a motor vehicle transmission having a speed ratio controlling device, a fluid pressure receiving cylinder, means including a main piston operable during a power stroke in said cylinder for actuating said controlling device, a displacing piston operable in said cylinder, means for supplying fluid under pressure to said cylinder for operating the main piston on its power stroke, means yieldingly urging movement of said displacing piston in opposition to fluid pressure acting on said displacing piston to supplement the power stroke of said main piston, fluid pressure operated means for preventing return movement of said displacing piston, said fluid pressure acting to relatively separate said pistons prior to completion of the power stroke of the main piston.

13. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selector operating means adapted for selective operating connection with said braking devices and including a reciprocatory operating element, fluid power operating means for reciprocating said operating element, a shiftable selector element, and means responsive to shifting of said selector element for controlling the operation of said selector operating means and said fluid power operating means to vary said speed ratio.

14. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selector operating means adapted for selective operating connection with said braking devices and including a reciprocatory operating element, fluid power operating means for reciprocating said operating element, a shiftable selector element, means responsive to shifting of said selector element for controlling the operation of said selector operating means and said fluid power operating means to vary said speed ratio, valving means controlling the supply of fluid under pressure to said fluid power operating means, and means responsive to operation of said reciprocatory element in one direction of reciprocating movement thereof for adjusting said valving means.

15. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selective operating means adapted for selective operating connection with said braking devices, fluid pressure operating means operably connected to said selector operating means, valve means controlling the supply of fluid pressure to said fluid pressure operating means, a manually adjustable selector element, means operably connecting said manually adjustable selector element with said selector operating means, means including a follower member operably connected to actuate said valve means, and an element having a series of cams carried thereby and adapted for movement in response to manual adjustment of said selector element, said follower being positioned for actuation by said cams.

16. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selector operating means adapted for selective operating connection with said braking devices, fluid pressure operating means operably connected to said selector operating means, valve means controlling the supply of fluid pressure to said fluid pressure operating means, a manually adjustable selector element, means operably connecting said manually adjustable selector element with said selector operating means, a cam member provided with a series of cams corresponding to positions of and adapted for movement in response to manual adjustment of said selector element, a reciprocatory follower adapted to be actuated by said cams in response to movement of said cam member, and means providing an operating connection between said follower and said valve means.

17. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, means for operating said braking devices and including a cylinder and piston assembly, manually operable speed ratio controlling means including means for selectively operably connecting said operating means with said braking devices, valve controlled means adjustable by said manual means for subjecting said cylinder to fluid pressure whereby to move said piston in one of its directions of reciprocation, and means for adjusting said valve controlled means and including a cam carrying member adapted for actuation by said manual means and a cam follower member adapted to operate said valve controlled means.

18. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, means for operating said braking devices and including a cylinder and piston assembly, manually operable speed ratio controlling means including means for selectively operably connecting said operating means with said braking devices, valve controlled means adjustable by said manual means for subjecting said cylinder to fluid pressure whereby to move said piston in one of its directions of reciprocation, means for adjusting said valve controlled means and including a cam carrying member adapted for actuation by said manual means and a cam follower member adapted to operate said valve controlled means, and means responsive to movement of said piston in said direction for relieving said cylinder of said fluid pressure.

19. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, means for operating said braking devices and including a cylinder and piston assembly, manually operable speed ratio controlling means including means for selectively operably connecting said operating means with said braking devices, valve controlled means adjustable by said manual means for subjecting said cylinder to fluid pressure whereby to move said piston in one of its directions of reciprocation, means for adjusting said valve controlled means and including a cam carrying member adapted for actuation by said manual means and a cam follower member adapted to operate said valve controlled means, means responsive to movement of said piston in said direction for relieving said cylinder of said fluid pressure, and a spring acting on said piston for moving said piston in the other of its said directions of reciprocation in response to said fluid pressure relief in said cylinder.

20. In an engine driven change speed transmission of the planetary gear type, a plurality of planetary gear sets having rotary control elements driven thereby, braking devices respectively for said rotary elements and adapted to selectively arrest rotation of said drums to vary the speed ratio drive through the transmission, selective operating means adapted for selective operating connection with said braking devices, fluid pressure operating means operably connected to said selector operating means, valve means controlling the supply of fluid pressure to said fluid pressure operating means, a manually adjustable selector element, means operably connecting said manually adjustable selector element with said selector operating means, means including a follower member operably connected to actuate said valve means, an element having a series of cams carried thereby and adapted for movement in response to manual adjustment of said selector element, said follower being positioned for actuation by said cams, and means for pivotally supporting said cam carrying element for swinging movement about said pivotal support.

21. In a motor vehicle transmission having a speed ratio controlling device, a cylinder having a fluid pressure receiving space, means including a piston operating in said space for actuating said controlling device, means for supplying fluid pressure to said space to operate said piston and means for accelerating the pressure rise in said cylinder space over the pressure rise produced by said fluid pressure supply.

22. In a motor vehicle planetary transmission having a plurality of speed ratio controlling braking devices adapted to selectively vary the driving speed ratio of the transmission, selector means adapted to selectively operate said braking devices, said selector means comprising a plurality of selector elements respectively operably associated with said braking devices, manually operable means selectively acting on one end of said selector elements for sliding a selected element, relative to the remaining selector elements, to position the other end thereof for operative engagement with its associated braking device, a common operator for said selector elements, means for slidably mounting said selector elements on said common operator, means for supporting said common operator for oscillatory movement, and power means responsive in operation to operation of said manually operable means for moving said common operator.

23. In a motor vehicle transmission having a speed ratio controlling device, a cylinder having a fluid pressure receiving space, means including a piston operating during its power stroke in such space for actuating said controlling device, said means further including a spring operated displacing member operating to supplement the power stroke of the piston and acting to reduce the volume of said space, means for supplying fluid pressure to said space, and means operated in response to said fluid pressure supplying means for releasably holding said spring operated displacing member against return movement under the influence of fluid pressure in said space.

24. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, selector operating means adapted for selective operating connection with said braking devices and including a common operating member, fluid power operating means for actuating said common member to operate said braking devices under selective control of said selector operating means, a shiftable selector element, and means responsive to shifting of said selector element for controlling the operation of said selector operating means and said fluid power operating means to vary said speed ratio.

25. In an engine driven change speed transmission of the planetary gear type, a plurality of planetary gear sets having rotary control elements driven thereby, braking devices respectively for said rotary elements and adapted to selectively arrest rotation of said rotary elements to vary the speed ratio drive through the transmission, selector operating means adapted for selective operating connection with said braking devices and including a common operating member, fluid power operating means for actuating said common member to operate said braking devices under selective control of said selector operating means, manually controlled operating means, and means responsive to actuation of said manually controlled operating means for controlling the operation of said selector operating means and said fluid power operating means to vary said speed ratio.

26. In a motor vehicle change speed transmission of the planetary gear type, a plurality of planetary gear sets having rotary control elements driven thereby, a plurality of devices respectively engageable with said rotary control elements to vary the speed ratio drive through the transmission, selector operating means adapted for selective operative connection with said devices and including a common operating member, fluid pressure operating means operably connected to said common operating member for power applying engagement of said devices, valving means controlling fluid pressure communication with said fluid pressure operating means, a manually adjustable selector element, and means responsive to adjustment of said selector element for effecting said selective operative connection of said selector operating means and for operating said valving means to effect power engagement of a selected device with its rotary control element.

HERBERT F. PATTERSON.